United States Patent
Pinel et al.

(10) Patent No.: US 7,593,704 B2
(45) Date of Patent: Sep. 22, 2009

(54) RECEIVER ASSEMBLY AND METHOD FOR MULTI-GIGABIT WIRELESS SYSTEMS

(75) Inventors: Stephane Pinel, Atlanta, GA (US); Joy Laskar, Marietta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 477 days.

(21) Appl. No.: 11/394,497

(22) Filed: Mar. 31, 2006

(65) Prior Publication Data

US 2006/0232469 A1 Oct. 19, 2006

Related U.S. Application Data

(60) Provisional application No. 60/666,839, filed on Mar. 31, 2005, provisional application No. 60/666,840, filed on Mar. 31, 2005, provisional application No. 60/667,287, filed on Apr. 1, 2005, provisional application No. 60/667,312, filed on Apr. 1, 2005, provisional application No. 60/667,313, filed on Apr. 1, 2005, provisional application No. 60/667,375, filed on Apr. 1, 2005, provisional application No. 60/667,443, filed on Apr. 1, 2005, provisional application No. 60/667,458, filed on Apr. 1, 2005.

(51) Int. Cl.
*H04B 7/08* (2006.01)
*H04B 1/06* (2006.01)

(52) U.S. Cl. ............ 455/130; 455/132; 455/272; 455/313; 375/147; 375/349

(58) Field of Classification Search ........... 455/63.4, 455/502, 132–136, 208, 214, 265, 272, 562.1, 455/313; 375/145, 324–328, 343, 347, 349, 375/354, 355, 147–150

See application file for complete search history.

(56) References Cited

U.S. PATENT DOCUMENTS

| | | | |
|---|---|---|---|
| 6,006,072 A | 12/1999 | Tsujimoto | |
| 6,157,621 A * | 12/2000 | Brown et al. | 370/310 |
| 6,351,508 B1 | 2/2002 | Shishkoff et al. | |
| 6,901,123 B2 * | 5/2005 | England | 375/347 |
| 6,980,586 B1 * | 12/2005 | Ballinger | 375/150 |
| 7,167,727 B2 * | 1/2007 | Lee et al. | 455/557 |
| 7,394,870 B2 * | 7/2008 | Chien et al. | 375/316 |
| 2004/0002307 A1 * | 1/2004 | Mizoguchi et al. | 455/101 |

(Continued)

OTHER PUBLICATIONS

International Search Report and Written Opinion for corresponding PCT case, International Application No. PCT/US2006/017014, dated Jan. 24, 2007.

(Continued)

*Primary Examiner*—Simon D Nguyen
(74) *Attorney, Agent, or Firm*—Seyed Kaveh E. Rashidi-Yazd; Troutman Sanders LLP; Ryan Schneider

(57) ABSTRACT

The present invention describes a receiver assembly for receiving an analog signal and converting the analog signal to a digital signal. The receiver assembly is, preferably, capable of receiving a signal operating at approximately 60 GHz. The receiver assembly includes a filter, a down converter, a demodulator, a latch, a FIFO, and a logic circuit. A method of converting the 60 GHz analog signal to a digital signal is also described.

15 Claims, 1 Drawing Sheet

U.S. PATENT DOCUMENTS

| | | |
|---|---|---|
| 2006/0067442 A1 | 3/2006 | Tanaka |
| 2006/0073802 A1* | 4/2006 | Chari et al. ............... 455/276.1 |
| 2006/0094385 A1* | 5/2006 | Rafati .......................... 455/272 |
| 2006/0126750 A1* | 6/2006 | Friedman ..................... 375/260 |
| 2006/0187100 A1* | 8/2006 | Kurose et al. ................ 341/143 |
| 2006/0193410 A1* | 8/2006 | Moorti et al. ................ 375/347 |
| 2007/0024506 A1* | 2/2007 | Hardacker ........... 343/700 MS |
| 2007/0091988 A1* | 4/2007 | Sadri et al. ................... 375/219 |
| 2008/0002652 A1* | 1/2008 | Gupta et al. ................ 370/338 |

OTHER PUBLICATIONS

Murakami, Yasushi et al., "A Switchable Multi-Sector Antenna for Indoor Wireless LAN Systems in the 60-GHz Band", IEEE Transactions On Microwave Theory And Techniques, vol. 46, No. 6, Jun. 1998, pp. 841-843.

* cited by examiner

RECEIVER ASSEMBLY AND METHOD FOR MULTI-GIGABIT WIRELESS SYSTEMS

CROSS-REFERENCE TO RELATED APPLICATIONS

This application claims the benefit of U.S. Provisional Application Nos. 60/666,839 and 60/666,840, both filed 31 Mar. 2005, and U.S. Provisional Application Nos. 60/667,287, 60/667,312, 60/667,313, 60/667,375, 60/667,443, and 60/667,458, collectively filed 1 Apr. 2005, the entire contents and substance of which are hereby incorporated by reference.

BACKGROUND OF THE INVENTION

1. Field of the Invention

The present invention relates to communication networks and, more particularly, to architecture for a high-speed, high-frequency wireless system.

2. Description of Related Art

As the world becomes more reliant on electronic devices, and portable devices, the desire for faster and more convenient devices has increased. Accordingly, producers of such devices strive to create faster, easier to use, and more cost-effective devices to serve the needs of consumers.

Indeed, the demand for ultra-high data rate wireless communication has increased, in particular due to the emergence of many new multimedia applications. Due to some limitations in these high data rates, the need for ultra-high speed personal area networking (PAN) and point-to-point or point-to-multipoint data links becomes vital.

Conventional wireless local area networks (WLAN), e.g., 802.11a, 802.11b, and 802.11g standards, are limited, in the best case, to a data rate of only 54 Mb/s. Other high speed wireless communications, such as ultra wide band (UWB) and multiple-input/multiple-output (MIMO) systems can extend the data rate to approximately 100 Mb/s.

To push through the gigabit per second (Gb/s) spectrum, either spectrum efficiency or the available bandwidth must be increased. Consequently, recent development of technologies and systems operating at the millimeter-wave (MMW) frequencies increases with this demand for more speed.

Fortunately, governments have made available several GHz (gigahertz) bandwidth unlicensed Instrumentation, Scientific, and Medical (ISM) bands in the 60 GHz spectrum. For instance, the United States, through its Federal Communications Commission (FCC), allocated 59-64 GHz for unlicensed applications in the United States. Likewise, Japan allocated 59-66 GHz for high speed data communications. Also, Europe allocated 59-62, 62-63, and 65-66 GHz for mobile broadband and WLAN communications. The availability of frequencies in this spectrum presents an opportunity for ultra-high speed short-range wireless communications.

Converting a signal from analog to digital at such high frequencies and at such high speeds is currently not cost effective. Also, line of sight is required to transmit at such frequencies and speed, so an obstruction in the wireless communication can slow, or even stop, transmission of communication.

What is needed, therefore, is an assembly for ultra-high frequencies (approximately 60 GHz) and ultra-high speeds (approximately 10 Gb/s) to convert from an analog signal to a digital signal that is low cost. Furthermore, a device adapted to operate when an obstruction, or severe shadowing, occurs is needed. It is to such a device that the present invention is primarily detected.

BRIEF SUMMARY OF THE INVENTION

The present invention is a receiver assembly. The receiver assembly comprises an N-array antenna assembly having a plurality of antennas, wherein the plurality of antennas are adapted to operate at a bandwidth of approximately 60 GHz; a plurality of amplifiers in communication with each antenna of the plurality of antennas of the N-array antenna assembly for amplifying a signal received by each antenna; a down converter for performing frequency conversion of a amplifier signal being emitted by each amplifier of the plurality of amplifiers; a demodulator adapted to recover data and recover clock signals; a latch for realigning clock signals, wherein the latch is based on a bit rate of a clock signal; a first-in/first-out circuit for organizing and recovering the clock signal; and a logic circuit for correlating known sequences to correct errors in the signal.

The logic circuit can emit a digital signal, wherein the receiver assembly receives the analog signal and converts the analog signal to the digital signal. The plurality of filters can be low noise amplifiers. The first-in/first out circuit can include serializer/deserializer (SERDES) architecture. The receiver assembly can further comprise a clocking device.

Each antenna of the plurality of antennas can provide approximately 10 dBi of gain, an azimuth 3 dB beam-width of approximately 60 degrees, and an elevation 3 dB beam-width in a range of approximately 30 to 35 degrees, which can produce an unexpected result at the preferred operating frequency.

Each antenna of the plurality of antennas can include a different orientation.

The N-array antenna assembly can provide a sectored coverage of approximately 60 degrees in an azimuth plane. The N-array antenna assembly can further provide a sectored coverage of approximately 180 degrees in an elevation plane.

The present invention also discloses a method. The method of converting an analog signal to a digital signal, wherein the analog signal has a bandwidth of approximately 60 GHz, the method comprising: receiving the analog signal operating at approximately 60 GHz with a plurality of antennas; feeding the analog signal received from the plurality of antennas to a filter; filtering the analog signal to create a cleaned signal; converting the frequency of the cleaned signal by down converting the cleaned signal; demodulating the signal; synchronizing the signal; and correlating the signal to known sequences.

Synchronizing the signal can include delaying the signal by delaying the signal with another signal.

These and other objects, features and advantages of the present invention will become more apparent upon reading the following specification in conjunction with the accompanying drawing figures.

DETAILED DESCRIPTION OF THE INVENTION

Figure 1:
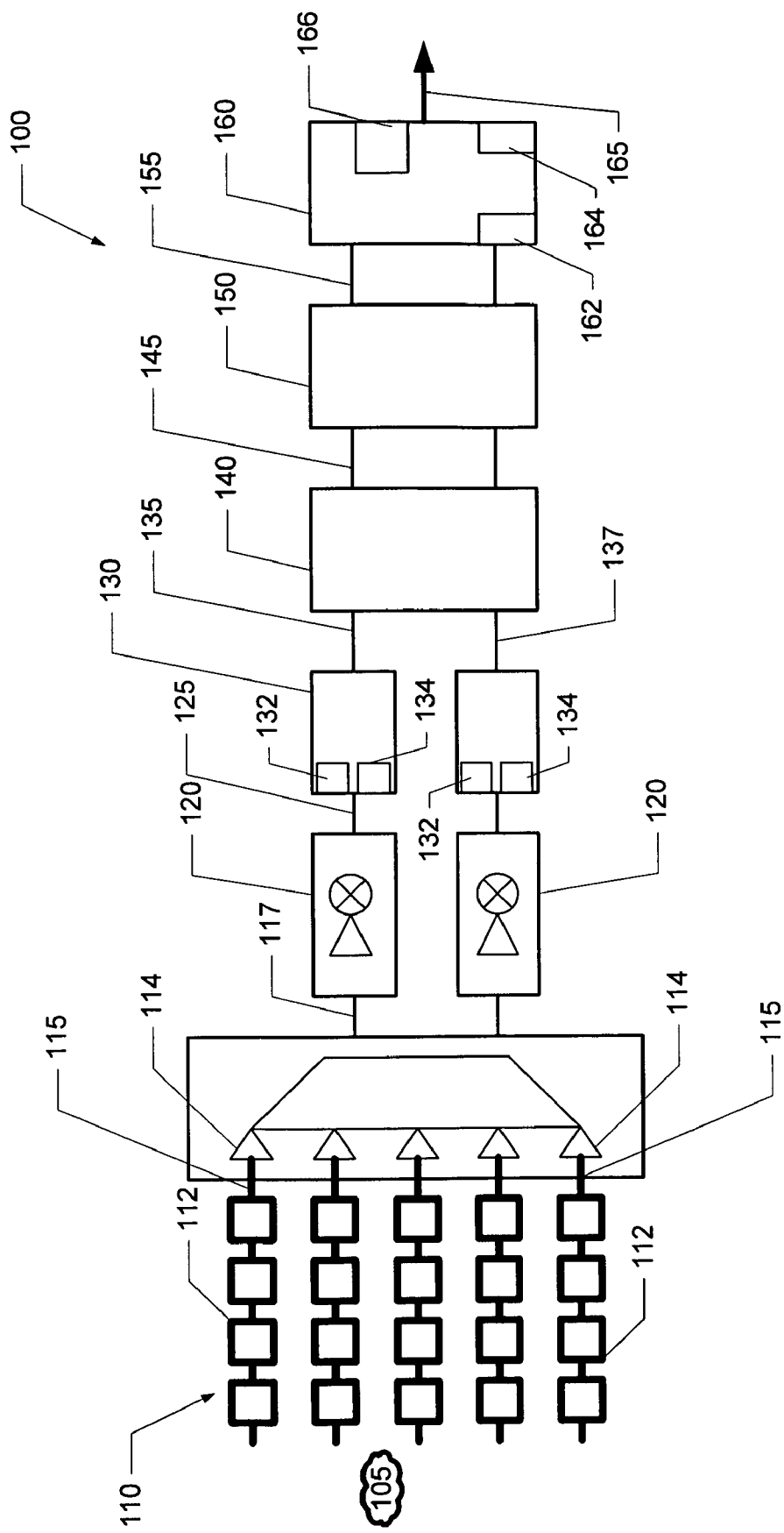
FIG. 1 illustrates a block diagram of a receiver assembly, in accordance with a preferred embodiment of the present invention.

To facilitate an understanding of the principles and features of the invention, it is explained hereinafter with reference to its implementation in an illustrative embodiment. In particular, the invention is described in the context of being a wireless receiver assembly for operation at ultra-high frequencies and ultra-high data communication speeds.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

The present invention is a receiver assembly 100. The receiver assembly 100 comprises an N-array antenna assembly 110, a down converter 120, a demodulator 130, a latch 140, a first-in/first-out circuit (FIFO) 150, and logic 160. The receiver assembly 100 obtains an analog signal from the air. The analog signal, as it is fed through the receive assembly 100, is converted to a digital signal. Accomplishing this analog to digital conversion is not an easy task at high frequencies and high data speeds.

The present invention is implemented with the combination of three over-arching concepts—antenna diversity, selection diversity (SD), and maximum ration combining (MRC). The present invention, preferably, operates at approximately 60 GHz, i.e., 54 to 66 GHz, and at approximately 10 Gb/s.

The N-array antenna assembly 110 includes N (number) fan beam series array antenna 112. That is, the N-array antenna assembly 110 includes a plurality of antennas 112. As illustrated in FIG. 1, there are 5 array antennas 112; one skilled in the art would recognize that many antennas 112 can be implemented. Each antenna 112 can be designed to provide approximately 10 dBi of gain, an azimuth (i.e., H-plane) of approximately 3 dB having a beam-width of approximately 60 degrees, and an elevation (i.e., E-plane) of approximately 3 dB having a beam-width of approximately 30 to 35 degrees, the combination of which can present unexpected results. Preferably, the selected N fan beam antennas 112 for the receiver assembly 100 are different from one another, wherein, for instance, the antennas 112 have different gain, radiation patterns, shapes, sizes, and other differing characteristics between the antennas 112.

The antennas 112 can be designed, further, to have different elevation beam orientations. The association of the different N antennas 112 can cover approximately 60 degrees in the azimuth plane, and approximately 180 degrees in the elevation plane. For instance, the N-array antenna assembly 110 includes three (3) antennas 112, the antennas 112 can cover approximately 180 in at least 2 planes. The antenna 112 can be designed to receive an analog signal 105, preferably operating at approximately 60 GHz.

Due to the direction pointed, each antenna 112 is less sensitive to a multi-path effect. Additionally, due to different beam orientations of the antenna 112, each antenna 112 can receive, preferably, a line of sight signal, or, alternatively, a reflected signal (for instance, from a wireless repeater). The arrangement of the antennas 112, as well as the plurality of antennas 112, of the N-array antenna assembly 110 can enable a variety of angles, wherein enabling the receiver assembly 100 to receive a number of different signals, or the same signal, at different strengths.

Each antenna 112 is connected to an amplifier 114. Preferably, the amplifier 114 is a low noise amplifier (LNA). As a signal 115 from each antenna 112 is transmitted through the antenna 112, the selection diversity concept can be applied to select antennas 112 that exhibit, or provide, the highest signal-to-noise ratio (SNR). That is, the selection diversity format enables the best signal to be calculated. The antenna 112 that provides the best signal has that signal secured, while weaker signals are eliminated.

The amplifier 114 can emit a signal 117. The signal 117 emitted from the amplifier 114 can then be fed into a down converter 120. The down converter 120 can be adapted to perform frequency conversion to a lower frequency band.

The down converter 120 can emit a signal 125. The signal 125 emitted from the down converter 120 is, preferably, fed next into a demodulator 130. The demodulator 130 can convert the signal 125 from the down converter 120 to a baseband signal. Indeed, the demodulator 130 is adapted to recover the signal 125 and further recover data from the signal 125, thus improving the signal 125, by preferred analog techniques.

In a preferred embodiment, the demodulator 130 includes clock-recovery technology 132 and data-recovery technology 134. The clock-recovery 132 and data-recovery 134 are applied to the signal 125 emitting from the down converter 120. The application of the clock-recovery 132 and data-recovery 134 can create streams of bits that can be synchronized with latch functionality.

These streams of bits, or signal 135, are inserted next into a latch 140. The latch 140 can realign the signal 135, which is dependent on the bit rate. A delay in the signal patch can be realigned in the latch 140. The latch 140 can take the signal 135 and hold it for a predetermined time in order to align it from another signal 137 from the demodulator 130, which can be received and fed from a different antenna through the receiver assembly, but can lag (time) a little behind the signal 135. The realignment is also dependent on the bit rate.

These streams of bits, collectively signal 145, are fed into the FIFO (first-in/first-out) 150. The FIFO 150 can use SERDES (serializer/deserializer) architecture. The SERDES can covert the signal 145 from/to a serial data stream and a parallel data stream.

The signal 155 from the FIFO 150 can be then fed into a logic circuit 160. The logic 160 can include coding to correlate known sequences of bits. The logic 160 can, preferably, include error detection 162 and error correction algorithms 164. Specifically, error detection 162 coding within the logic 160 can correlate streams of data. Moreover, a maximum ratio, which can combine and take different input signals to correlate and assign weights, or preferences, of the signals. An analog signal to noise ratio 166 can be used to enables determining the weight of the signal.

The signal 165 emitted from the logic 160 is a digital signal. The analog signal 105 received by one or more antennas, as the signal runs through the receiver assembly, is converted to a digital signal.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A method of converting an analog signal to a digital signal, wherein the analog signal has a frequency of approximately 60 GHz, the method comprising:
   receiving at least two analog signals operating at approximately 60 GHz with a plurality of antennas;
   processing the at least two analog signals in parallel;
   feeding a first analog signal received from the plurality of antennas to a first amplifier;
   feeding a second analog signal received from the plurality of antennas to a second amplifier;
   amplifying the first and second analog signals to create a first cleaned signal and a second cleaned signal;
   converting the frequency of the first and second cleaned signals by down converting the first and second cleaned signals;

demodulating a first down converted signal for clock signal and data signal recovery;

demodulating a second down converted signal for clock signal and data signal recovery;

synchronizing in parallel the demodulated signals;

correlating the demodulated signals to known sequences for alignment; and outputting a combined digital signal.

2. The method of claim 1, wherein the combined digital signal is subjected to error detection and error correction prior to output.

3. A receiver assembly comprising:

an N-array antenna assembly comprising a plurality of antennas, wherein the plurality of antennas are adapted to receive an analog signal at a frequency of approximately 60 GHz;

a first amplifier adapted to receive a first analog signal from a first antenna of the plurality of antennas, amplify the first analog signal, and output a first amplified signal;

a second amplifier adapted to receive a second analog signal from a second antenna of the plurality of antennas, amplify the second analog signal, and output a second amplified signal;

a first down converter for performing a frequency conversion on the first amplified signal and outputting a first down converted signal;

a second down converter for performing a frequency conversion on the second amplified signal and outputting a second down converted signal;

a first demodulator adapted to recover and output a first data signal and a first clock signal from the first down converted signal;

a second demodulator adapted to recover and output a second data signal and a second clock signal from the second down converted signal;

a latch adapted to synchronize in parallel the first and second data signals and the first and second clock signals;

a FIFO adapted to align the first data signal and the second data signal; and a logic circuit adapted to correlate the first and second data signals to each other, combine the first data signal and the second data signal from the FIFO, detect and correct errors, and output a digital signal.

4. The receiver assembly of claim 3, the logic circuit emitting a digital signal, and the receiver assembly receiving an analog signal and converting the analog signal to the digital signal.

5. The receiver assembly of claim 3, the plurality of amplifiers comprising low noise amplifiers.

6. The receiver assembly of claim 3, the first and second demodulators comprising a clock and data recovery system for generating a clock signal to the receiver assembly.

7. The receiver assembly of claim 3, each antenna of the plurality of antennas providing approximately 10 dBi of gain, an azimuth 3 dB beam-width of approximately 60 degrees, and an elevation 3 dB beam-width in a range of approximately 30 to 35 degrees.

8. The receiver assembly of claim 3, each antenna of the plurality of antennas including a different orientation.

9. The receiver assembly of claim 3, the N-array antenna assembly providing a sectored coverage of approximately 60 degrees in an azimuth plane.

10. The receiver assembly of claim 8, the N-array antenna assembly providing a sectored coverage of approximately 180 degrees in an elevation plane.

11. A receiver assembly comprising:

a first antenna of an N-array antenna assembly adapted to receive a first portion of an analog signal at a frequency of approximately 60 GHz and provide a first signal;

a second antenna of the N-array antenna assembly adapted to receive a second portion of the analog signal at a frequency of approximately 60 GHz and provide a second signal;

a first amplifier adapted to receive the first signal, amplify the first signal, and output a first amplified signal;

a second amplifier adapted to receive the second signal, amplify the second signal, and output a second amplified signal;

a first down converter adapted to receive the first amplified signal, perform a frequency conversion on the first amplified signal, and output a first down converted signal;

a second down converter adapted to receive the second amplified signal, perform a frequency conversion on the second amplified signal, and output a second down converted signal;

a first demodulator adapted to recover and output a first data signal and a first clock signal from the first down converted signal;

a second demodulator adapted to recover and output a second data signal and a second clock signal from the second down converted signal;

a latch for receiving the first data signal and first clock signal from the first demodulator, the second data signal and second clock signal from the second demodulator, and adapted to synchronize in parallel the demodulated signals;

a FIFO for aligning the first data signal and the second data signal; and a logic circuit adapted to combine the first data signal and the second data signal from the FIFO and output a combined digital signal.

12. The receiver assembly of claim 11, wherein the FIFO aligns the first data signal and the second data signal in parallel.

13. The receiver assembly of claim 11, the logic circuit using a signal to noise ratio to generate the desired output.

14. The receiver assembly of claim 11, the first antenna having the highest signal-to-noise ratio and the second antenna having the second highest signal-to-noise ratio of the antennas in the N-array antenna assembly.

15. The receiver assembly of claim 11, the logic circuit further adapted to detect and correct errors in the combined digital signal prior to outputting the combined digital signal.

* * * * *